United States Patent [19]

Boyer

[11] Patent Number: 5,431,481
[45] Date of Patent: Jul. 11, 1995

[54] SIDE DUMPING TRAILER

[76] Inventor: Bill B. Boyer, R.R. 2, Box 54, Hawarden, Iowa 51023

[21] Appl. No.: 296,454

[22] Filed: Aug. 26, 1994

[51] Int. Cl.⁶ ................................................. B60P 1/56
[52] U.S. Cl. ................................ 298/35 R; 298/35 M
[58] Field of Search ................ 105/252, 283, 284, 288, 105/289, 299; 296/51; 298/35 R, 35 M, 36

[56] References Cited

U.S. PATENT DOCUMENTS 3,145,057  8/1964  Taggart ........................... 298/35 M
3,298,745  1/1967  Czapiewski ..................... 298/35 M Primary Examiner—F. J. Bartuska
Assistant Examiner—Janice L. Krizek

[57] ABSTRACT

A truck trailer useful for carrying road surfacing material such as gravel, crushed rock, limestone or the like. A feature of the trailer is that it empties to the side of the trailer and directly from the bottom. Doors on the side separately operable facilitate the side dumping.

3 Claims, 2 Drawing Sheets

SIDE DUMPING TRAILER

BACKGROUND AND SUMMARY OF THE INVENTION

This invention pertains to mobile containers for hauling particulate material and particularly road surfacing materials such as gravel or crushed rock. Such materials are customarily dumped onto the road surface from the bottom of a truck or trailer device. An alternative type of carrier dumps from the rear of a box by tilting the front of the box upward.

Currently used devices have certain drawbacks. The rear dump device requires hydraulic mechanism and a box, the bottom of which is as high as the rear wheels so that tilting of the front will carry the material over the wheels. This design is useful in smaller trucks, but is difficult in large capacity semi-trailers both because of the higher center of gravity which is necessary, and because of the force required to tilt a full box with such a large load.

The center dump trailer has a different problem. Dumping a large load of stone or gravel between the wheels of the trailer creates a large mound of material which may interfere with pulling the trailer from the location. Typically such loads are dumped from a slowly moving trailer to avoid the high mounding. This type of dumping may result in very uneven distribution of the material which may also be spread out over a large area.

By the present invention, a trailer is provided with the capability of dumping to the side. Because the trailer can be "jack-knifed" into place and then pulled sharply to one side, the load can be fully dumped while the trailer is stationary and the dumped load can be avoided by the sharp turn on pulling away from the location of the drop. Thus, unnecessary and undesired spreading of the load is avoided.

DESCRIPTION

Figure 1:
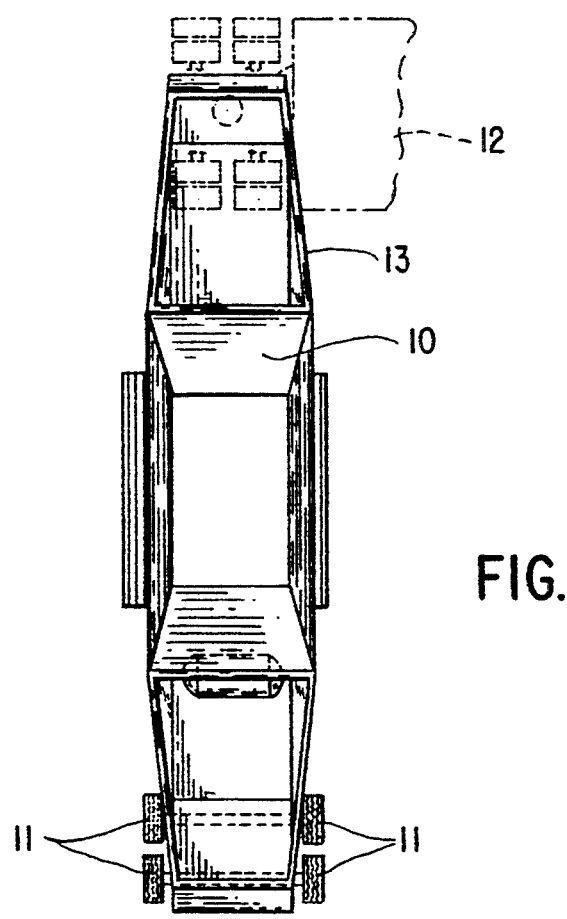
FIG. 1 is a top plan view of the trailer with the side dump door open.
Figure 2:
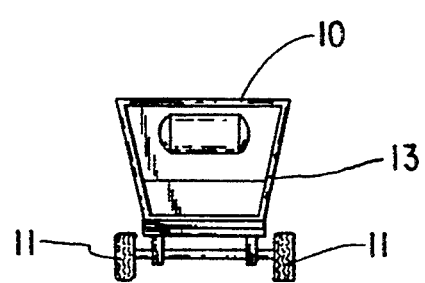
FIG. 2 is an end elevational view of the trailer of FIG. 1 but with the door closed.

Briefly this invention comprises a trailer having dumping doors which open differentially on the side so that the contents of the trailer will be dumped to the side.

More specifically and referring to the drawings, the trailer, like most gravel or rock trailers, includes a hopper style box 10 mounted on multiple wheels 11. The trailer is adapted to be pulled by a truck-tractor 12. The hopper box 10 is mounted on a frame 13 supported by the wheels. This sort of structure is common to many types of trailers adapted for the purpose of hauling materials for road construction, airport runway construction or similar projects.

The unique feature of the present trailer which makes it extremely useful in projects where the materials need to be dumped in a line is the location and operation of the dump gates. As in most trailers, there are two gates 15 hinged on a longitudinal axis or axles 16.

Each gate is composed of two end plates 18 joined by a plurality of reinforcing bars 19. A barrier material forms a lining 20 for the bars 19 to hold the hauled material. In the usual device, these gates would be similarly pivoted and would have hydraulic or pneumatic piston and cylinder assemblies to open and close them equally so that the gravel or crushed rock would fall from the hopper approximately at its longitudinal center-line.

Figure 4:
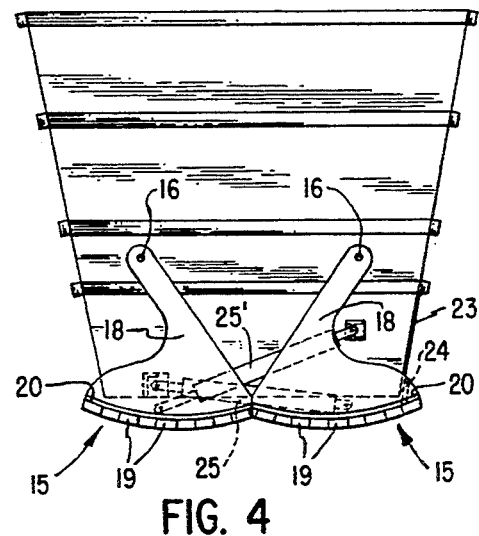
FIG. 4 is a view similar to FIG. 3 with the door closed.
Figure 6:
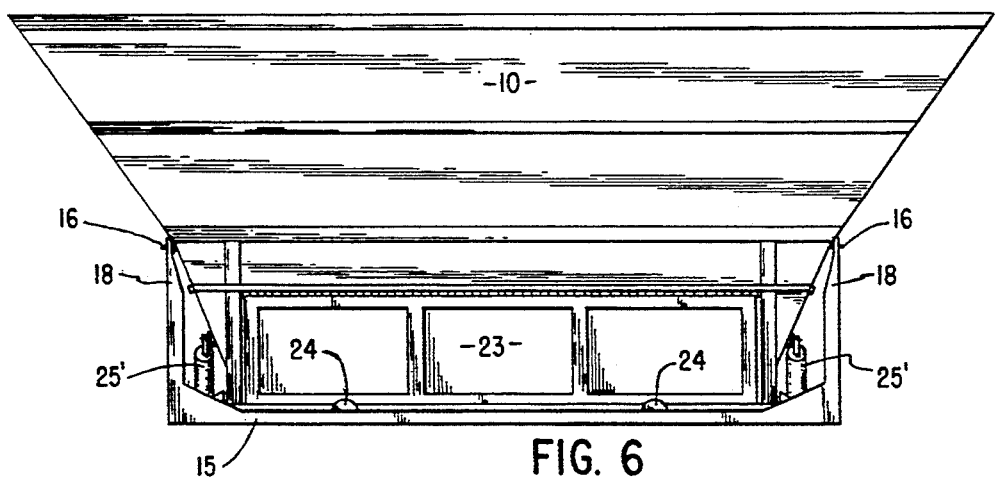
FIG. 6 is a view similar to FIG. 5 of the hopper of FIG. 4.

In the present invention, a door 23 is also hinged to the side of the hopper 10 so that the side can be opened along with the bottom. This door 23 is normally held in a closed position (FIGS. 4 and 6) by tabs 24 on the dump gate on one side of the hopper. The pneumatic or hydraulic devices 25 and 25' are similar except that, on the side of the door 23, the piston-cylinder assembly 25 is adapted to fully open and raise the dump gate 15, while on the opposite side the device 25' opens the gate 15 only enough to clear the bottom of the hopper 10.

Figure 3:
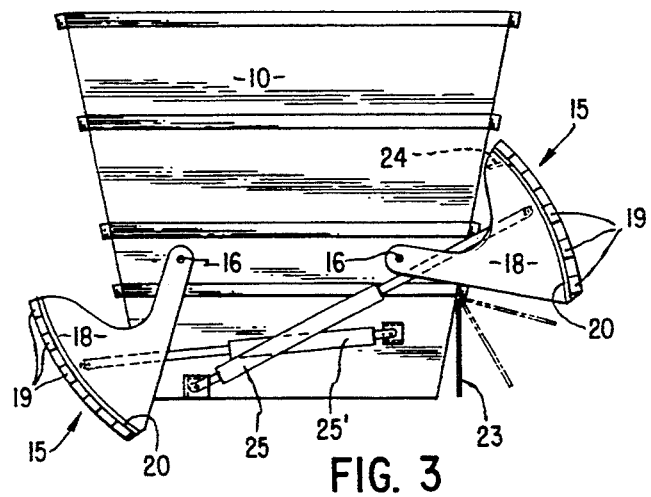
FIG. 3 is a detailed, front end elevational view of the hopper of the trailer with the door open.
Figure 5:
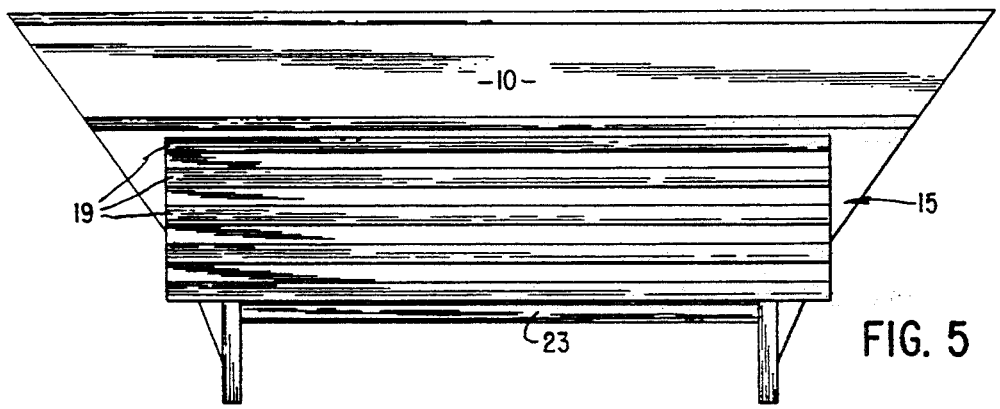
FIG. 5 is a side elevational view of the hopper of FIG. 3 from the full opening side.

In operation the hopper 10 is filled while both gates 15 and the door 23 are fully closed. The trailer is then pulled to the construction site where the trailer is "jack-knifed" into the position shown in FIG. 1 by the operator driving the tractor 12. The operating pistons are then actuated to move the gate 15 to the positions shown in FIGS. 3 and 5. Movement of the gates also releases the door 23 to open to the alternate position shown by dashed lines in FIG. 3. The contents of the hopper will then flow out through the open areas, and because of the asymmetry of the opening, flow mostly to the side of the trailer. The truck tractor 12 can then pull the trailer sharply to the side away from the dumped material leaving the material in a relatively neat pile. Because the wheels of the trailer are substantially displaced from the hopper even in present configurations, the trailer can be removed with no disturbance to the dumped pile either by structure of the trailer or by wheels, thus avoiding unnecessary and wasteful spreading of the pile.

As the trailer is moved, the door 23 will drop down by its own weight. The gate 15 can be closed by the operating system, and in that process the tab 24 will again contact the lower edge of the door 23 to hold it closed for the next load.

I claim as my invention:

1. For use on a semitrailer, a hopper adapted to carry sand, gravel and other particulate material, said hopper having two ends, two lateral sides, an open top and a closable bottom, a first of said lateral sides forming an open space near said bottom, closure means on said hopper adapted to close said bottom, said closure means closing said open space and allowing said space to be opened when said closure means opens said bottom, said closure means comprising first and second dump gates extending over said bottom and pivotally attached to said hopper at its ends, said first and second dump gates being operable to be differentially opened, said first dump gate being operable to clear only said bottom and said second dump gate being operable to clear said bottom and also said open space on said first lateral side.

2. The hopper of claim 1 in which a door is pivotally attached to said first lateral side and is adapted to close said open space, said second dump gate being engageable with said door to hold said door closed when said dump gates close said bottom and to allow said door to open when said second dump gate is moved to open said bottom.

3. The hopper of claim 2 in which tabs are located on said second dump gate in position to engage said door when said dump gates close said bottom, whereby said door is held in a closed position when said dump gates close said bottom.

* * * * *